Nov. 16, 1926. 1,607,464
W. H. KIRBY
FLOAT OPERATED CIRCUIT CLOSER
Filed Nov. 18, 1924 2 Sheets-Sheet 1
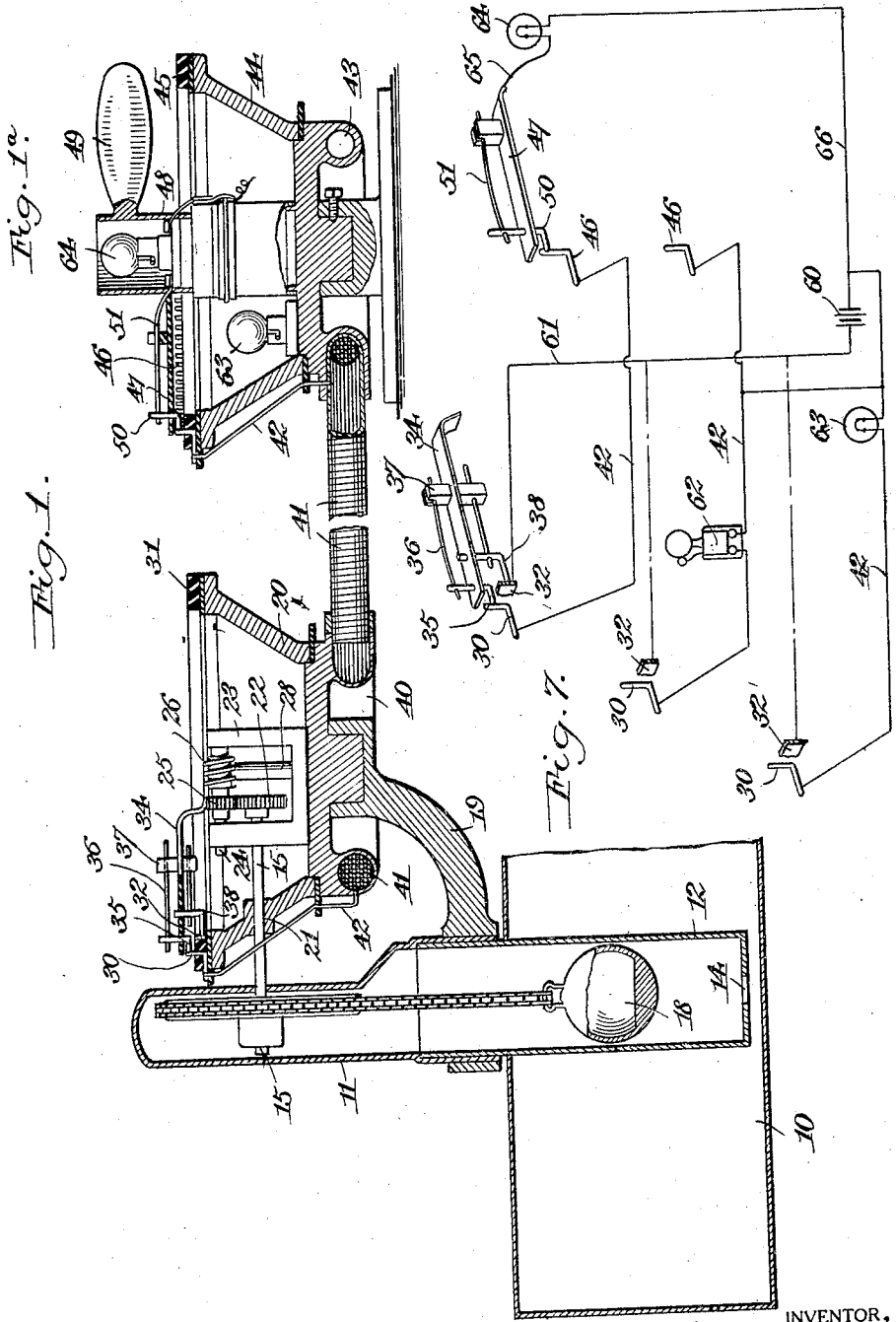
WITNESSES:
Cris Feinle.
P. A. Pattison.
INVENTOR,
W. H. Kirby.
BY
ATTORNEYS.

Nov. 16, 1926.  
W. H. KIRBY  
1,607,464  
FLOAT OPERATED CIRCUIT CLOSER  
Filed Nov. 18, 1924   2 Sheets-Sheet 2
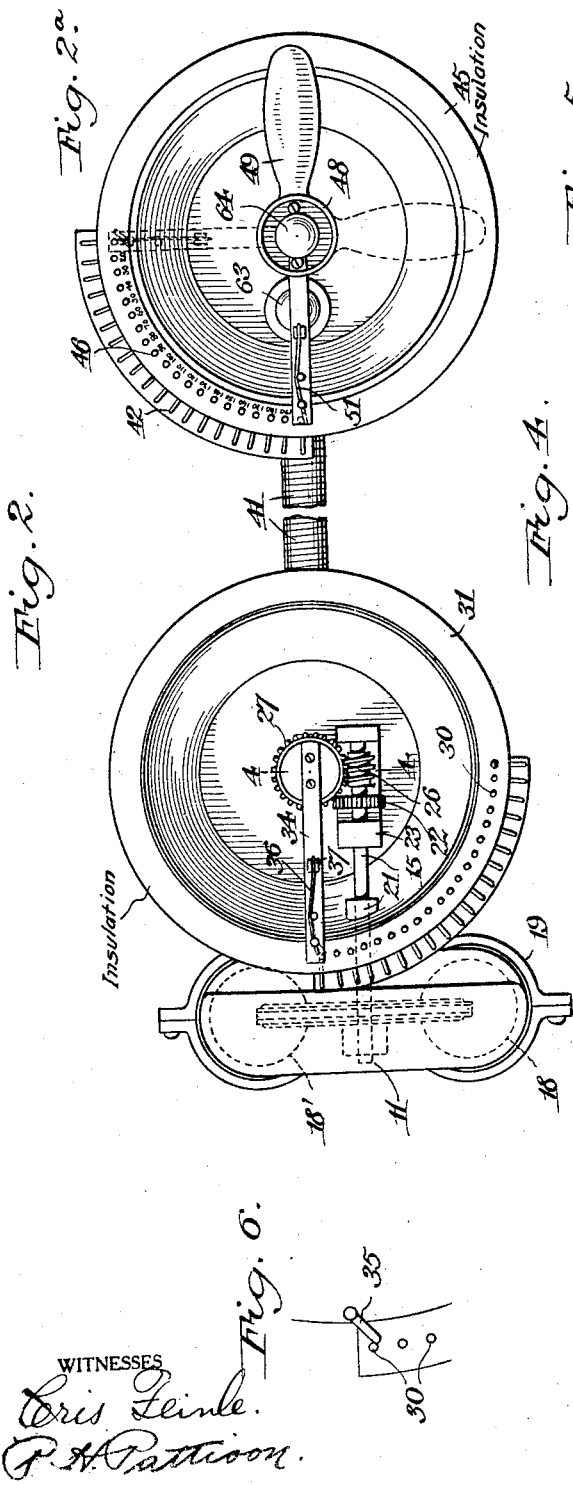
INVENTOR,  
W. H. Kirby.  
BY  
ATTORNEYS.

Patented Nov. 16, 1926.

1,607,464

UNITED STATES PATENT OFFICE.

WILLIAM HARRINGTON KIRBY, OF BEVERLY, MASSACHUSETTS.

FLOAT-OPERATED CIRCUIT CLOSER.

Application filed November 18, 1924. Serial No. 750,681.

The invention relates to circuit closers and more particularly to float operated circuit closers. While the improvement is shown in connection with a gauge for determining the level of the liquid in a tank, yet it is to be understood that it is adapted for other purposes. The object of the invention is to provide a circuit closer of the character indicated which is simple, cheap and efficient in operation.

With the above and other objects in view, reference is had to the accompanying drawings, in which—

Figure 1 is a vertical sectional view of a gauge constructed in accordance with the present invention;

Figure 1ª is a detailed sectional view of an additional element for use in connection with the gauge;

Figure 2 is a top plan view of that portion of the mechanism shown in Figure 1;

Figure 2ª is a view in elevation of that portion of the device shown in Figure 1ª;

Figure 3 is a detail sectional view showing the operating float and its counterbalance;

Figure 4 is a detail sectional view taken on the line 4—4 of Figure 2;

Figure 5 is a detail sectional view showing the manner of mounting the lamp shown in Figures 1ª and 2ª.

Figure 6 is a detail plan view;

Figure 7 is a diagrammatic view showing a portion of the circuits employed.

Referring more particularly to the drawings, the reference numeral 10 designates a tank or other suitable container, and the said tank carries a housing 11. Extending downwardly from the housing 11 and into the tank 10, there are two tubular legs 12 and 13, the leg 12 having an opening in the bottom wall thereof in order that the liquid contents of the tank 10 may pass into the tubular member 12. Mounted in the housing 11, there is a shaft 15, and carried by said shaft 15 there is a sprocket wheel 16. Passing over the sprocket wheel 16, there is a chain 17. Connected to one end of the chain 17, there is a float 18 operating in tubular leg 12, and connected to the other end of the chain there is a counterbalance weight 18′ operating in the tubular leg 13.

Secured to the housing 11, there is a bracket 19, and said bracket 19 supports a housing 20. The shaft 15 heretofore mentioned extends through the side wall of the housing 20 as at 21, and upon its inner end it is provided with a gear 22. The inner end of the shaft 15 is mounted in a substantially U-shaped member 23, and this member carries a counter shaft 24 upon which is mounted a gear 25 meshing with the gear 22 heretofore mentioned. Carried by this counter shaft 24, there is a worm gear 26, and, as more clearly shown in Figure 2, this worm gear 26 meshes with a worm wheel 27. The worm wheel 27 is carried upon the upper end of a vertically disposed shaft 28, and this worm wheel 27 is adapted to be driven by the worm gear 26.

The housing 20 is preferably open, and on its periphery it is provided with a plurality of contact members 30. The reference numeral 31 designates a ring of suitable insulating material, and this ring carries a commutator band 32. Carried by the worm wheel 27 heretofore mentioned, there is an arm 34, and said arm carries a contact finger 35 adapted to engage the contact points 30 heretofore mentioned. This contact finger 35 is resilient and is carried upon the outer end of the spring 36 mounted as at 37. This arm 34 also carries a contact finger 38 which engages the commutator ring 32 heretofore mentioned.

The bottom of the housing 20 is formed with an auxiliary housing 40, and mounted therein there is a cable 41 which consists of a plurality of wires 42 connected to their respective contact points 30 heretofore mentioned. This cable 41 extends to a similar housing 43 formed in the bottom of a housing 44 similar to the housing 20. This housing 44 is suitably mounted in a plane at right angles to the housing 20, and said housing 44 carries a ring of insulating material 45. This housing has a plurality of contact points 46, and the wires of the cable 41 are connected to these contact points, it being understood that the wire connected to the contact points 30 is connected to the corresponding contact point 46 carried by the housing 44.

The reference numeral 47 designates a rotating arm operated by a housing 48, to which is attached a weighted handle 49. Carried by this arm 47, there is a contact finger 50 resiliently mounted by means of a spring 51.

As shown in Figure 7, the diagrammatic view, the reference numeral 60 designates a suitable source of power, and this source of power is connected to the commutator ring 32 by means of a conductor 61. The several pins 30 are connected to their respective pins 46 by the conductors 42 heretofore mentioned. In one of these conductors 42 which leads from the end pin, for example, the position shown in Figure 2, of the arm 34, there is an audible signal 62, and in the conductor 42 connecting the pin at the other extreme end of the series of pins 30, there is a visible signal 63. Carried by the housing 44, there is a lamp or other visual signal 64, the lamp 63 being shown in Figure 1ª as well as in Figure 7. This lamp 64 is connected to the arm 47 by means of a conductor 65 and to the source of power 60 by a conductor 66.

The device operates in the following manner: Assuming that the tank is empty, with the tank empty, the finger 35 of the arm 34 will engage the bottom contact 30 in Figure 2. As liquid is introduced into the tank, the float 18 rises in the tubular member 12, and the counterbalance weight 19 through the medium of the sprocket 16 operates the shaft 15. Through the medium of the gears 22 and 25, the worm gear 26 drives the worm wheel 27 and causes the arm 34 to move upwardly from engagement with the bottom contact 30 throughout the series of contacts until it reaches the position shown in Figure 2. In this position, the circuit will be completed through the audible signal 62 to give an indication that the tank has been filled. As the fluid is removed from the tank 10, the float will descend and serve to drive the shaft 15 in the opposite direction. This moves the arm 34 and its contact finger 35 in the opposite direction to successively engage the contacts 30 until it reaches the bottom contact 30, when the signal 63 will be illuminated to indicate that the tank should be refilled.

If it is desirable to ascertain at any time the level of liquid in the tank 10, it is only necessary to move the handle 49 to move the arm 47 so that its contact finger 50 will engage successively the contacts 46. Immediately the contact finger 50 engages that contact 46 which is connected to the contact 30 with which the spring finger 35 is engaged, a circuit will be completed through the lamp 64 to illuminate the same.

It will be noted that each of the contacts 46 in Figure 2ª designates the number of gallons contained in the tank for that particular position, and thus it will be seen that if the spring contact finger 35 is in engagement with the uppermost contact, in which position it is shown in Figure 2, and the spring finger 50 is engaged with the uppermost contact 46, in which position it is shown in full lines in Figure 2ª, a circuit will be completed to illuminate the lamp 64 and the position of the contact finger 50 will indicate that there are 200 gallons of liquid in the tank.

From the foregoing, it is apparent that the present invention provides a tank gauge by means of which a signal is given when the tank is either full or empty and, furthermore, that a reading of the level of the tank may be taken at any time.

It is obvious that the markings of the various contact points are only arbitrary and that the same may be changed without departing from the spirit of the invention.

Having thus described the invention, what is claimed is:

1. In a float operated circuit closer, a plurality of contacts arranged in an arc of a circle, a resilient contact finger movable over and into engagement with the contacts, a shaft, a train of gearing operated by the shaft, one of the gears of which carries the contact finger, and means for operating the shaft, said means including a sprocket wheel on the shaft and a chain passing over the sprocket wheel and having a float at one end and a weight at the other end.

2. In a float operated circuit closer, a plurality of contacts arranged in an arc of a circle, a shaft having a sprocket wheel at one end and a gear wheel at its other end, a gear wheel geared with the gear wheel of the shaft, an arm on the shaft of the gear wheel geared with the said shaft, a resilient contact finger on the arm, and a chain passing over the sprocket wheel and having a float at one end and a weight at the other end.

3. In a float operated circuit closer, a bowl-shaped casing having on its edge a plurality of contacts and a commutator band, an arm, a contact finger resiliently mounted on the arm and adapted to engage the contacts, a contact finger on the arm and adapted to engage the commutator band, a shaft, a sprocket wheel on the shaft, a chain passing over the sprocket wheel and having a float at one end and a weight at the other end, and a train of gearing operated by said shaft, one gear of which gearing carries the said arm.

4. In a float operated circuit closer, a tank, a housing having tubular legs extending into the tank and projecting above the tank, a bowl-shaped housing carried by the first housing and having a plurality of contacts and a commutator band on its edge, a shaft mounted in the said housings and having a sprocket wheel in the first housing, a chain passing over the sprocket wheel and having a float at one end and a weight at the other end, the float and weight being in the legs of the housing, a train of gearing operated by the said shaft, and an arm carried by one of the gears of said train and provided with contact fingers for engaging the contacts and commutator band.

5. In a float operated circuit closer, a tank, a housing extending in the tank and projecting above the tank, a bowl-shaped housing carried by the first housing and having on its edge contacts and a commutator ring, a float operated shaft mounted in the said housings, a countershaft mounted in the bowl-shaped casing and operated from the float operated shaft, a worm gear on said shaft, a vertical shaft, a worm wheel on the vertical shaft and meshing with the worm gear, an arm carried by the worm wheel, a resilient finger carried by the arm for engaging the contacts and a finger also carried by the arm for engaging the commutator band.

WILLIAM HARRINGTON KIRBY.